(12) United States Patent
Hanson et al.

(10) Patent No.: US 10,419,100 B2
(45) Date of Patent: Sep. 17, 2019

(54) DOPPLER SHIFT CORRECTION SUB-SYSTEM FOR COMMUNICATION DEVICE

(75) Inventors: Van E. Hanson, Forest, VA (US); Alfons Dussmann, Gansheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 35 days.

(21) Appl. No.: 14/399,581

(22) PCT Filed: May 7, 2012

(86) PCT No.: PCT/US2012/036794
§ 371 (c)(1),
(2), (4) Date: Feb. 10, 2015

(87) PCT Pub. No.: WO2013/169225
PCT Pub. Date: Nov. 14, 2013

(65) Prior Publication Data
US 2015/0147960 A1 May 28, 2015

(51) Int. Cl.
*H04B 7/155* (2006.01)
*H04L 27/10* (2006.01)
*H04W 64/00* (2009.01)

(52) U.S. Cl.
CPC ......... *H04B 7/15528* (2013.01); *H04L 27/10* (2013.01); *H04W 64/003* (2013.01); *H04W 64/006* (2013.01)

(58) Field of Classification Search
CPC combination set(s) only.
See application file for complete search history.

(56) References Cited

U.S. PATENT DOCUMENTS

| 6,008,758 | A | * | 12/1999 | Campbell | ............. | H04B 7/208 |
|---|---|---|---|---|---|---|
| | | | | | | 342/358 |
| 6,614,860 | B1 | | 9/2003 | Piirainen | | |
| 6,675,013 | B1 | | 1/2004 | Gross et al. | | |
| 6,952,440 | B1 | | 10/2005 | Underbrink | | |

(Continued)

FOREIGN PATENT DOCUMENTS

| CN | 101699917 A | 4/2010 |
|---|---|---|
| EP | 1980487 A1 | 10/2008 |

OTHER PUBLICATIONS

International Patent Application No. PCT/US2012/036794, International Search Report and Written Opinion dated Jan. 24, 2013, 9 pages.

(Continued)

*Primary Examiner* — Zhitong Chen
(74) *Attorney, Agent, or Firm* — Fogg & Powers LLC

(57) ABSTRACT

Certain aspects and embodiments are directed to a Doppler shift correction sub-system that can be disposed in a mobile repeater. The Doppler shift correction sub-system can include a processor and a frequency-shifting module. The processor can be configured to determine a corrective frequency shift based on a velocity of the repeater relative to a source and a representative transmission frequency. The processor can provide the corrective frequency shift to a frequency-shifting module. The frequency-shifting module can be configured to shift the signal using the corrective frequency shift prior to transmitting the signal to a destination, such as a mobile device.

15 Claims, 4 Drawing Sheets

(56) References Cited

U.S. PATENT DOCUMENTS

| | | | |
|---|---|---|---|
| 7,388,902 B2 | 6/2008 | Boulanger et al. | |
| 2004/0097190 A1 | 5/2004 | Durrant et al. | |
| 2007/0021122 A1 | 1/2007 | Lane et al. | |
| 2007/0161347 A1 | 7/2007 | Ma et al. | |
| 2007/0213085 A1 | 9/2007 | Fedora | |
| 2008/0263601 A1* | 10/2008 | Hebb | H04H 20/02 |
| | | | 725/68 |
| 2009/0267591 A1* | 10/2009 | Roberts | G01S 11/10 |
| | | | 324/160 |
| 2009/0325594 A1* | 12/2009 | Lan | H04W 48/18 |
| | | | 455/456.1 |
| 2011/0294528 A1 | 12/2011 | Husted et al. | |
| 2012/0129520 A1* | 5/2012 | Rao | H04W 64/00 |
| | | | 455/432.3 |
| 2014/0302872 A1* | 10/2014 | Lane | H04B 7/01 |
| | | | 455/456.1 |

OTHER PUBLICATIONS

European Patent Office, "Office Action from EP Application No. 12721141.5 dated Feb. 23, 2018", "from Foreign Counterpart of U.S. Appl. No. 14/399,581", Feb. 23, 2018, pp. 1-5, Published in: EP.

* cited by examiner

US 10,419,100 B2

DOPPLER SHIFT CORRECTION SUB-SYSTEM FOR COMMUNICATION DEVICE

CROSS-REFERENCE TO RELATED APPLICATION

This is a U.S. national phase application under 35 U.S.C. 371 of International Patent Application No. PCT/US2012/036794 filed May 7, 2012 and titled "Doppler Shift Correction Sub-System for Communication Device," the entirety of which is incorporated herein by reference.

TECHNICAL FIELD

This disclosure relates generally to telecommunications systems and more particularly relates to correcting a Doppler shift in signals transmitted to and from a communication device such as a repeater or mobile phone.

BACKGROUND

Signal repeaters can be used to extend the range of signals by receiving a signal from a source and retransmitting the signal to a mobile device or other receiver. A signal repeater can thus extend the range of a signal by, for example, retransmitting an attenuated signal at a higher power. A signal repeater can also extend the range of a signal by, for example, relaying a signal from one side of an obstacle that may otherwise obstruct the signal to another side of the obstacle, such as the walls of a building or other structure that may block wireless signals.

A signal repeater can be used to provide signal coverage for mobile devices in or associated with moving vehicles, such as planes, trains, automobiles, ferries, etc. A repeater can be installed on or in a vehicle. The repeater can amplify signals communicated between mobile devices in or associated with the vehicle, such as cellular phones, and fixed sources or receivers, such as base stations for telecommunication service providers. The movement of the repeater relative to a source and/or a receiver can cause a frequency shift in the signal due to the Doppler effect. A sufficiently large frequency shift can degrade the ability of a receiver to demodulate, decode, or otherwise process the signal.

For example, a downlink signal can be transmitted at frequency $f_d$ from a base station to one or more mobile devices in a train carriage via a repeater installed in the train carriage. The movement of the repeater can cause the repeater to receive the downlink signal from a base station at a frequency $f_d+f_{\Delta,\,d}$ and transmit the downlink signal to mobile devices at a frequency $f_d+f_{\Delta,\,d}$, where $f_{\Delta d}$ is the Doppler shift in a downlink signal caused by the movement of the repeater relative to the base station. Uplink signals can be transmitted from the mobile devices to the base station via the repeater at frequency $f_u$ and received by the base station at $f_u+f_{\Delta,\,u}$ due to the Doppler shift $f_{\Delta,\,u}$ in the uplink signal caused by the movement of the repeater and relative to the base station. The frequency shift error at the base station can be compounded by mobile devices using the frequency of the signals received from a base station as a reference. For example, a mobile device configured to use frequency $f_x$ received from a base station may instead use the frequency $f_x+f_{\Delta,\,d}$ as a reference signal. A Doppler shift in the signal transmitted from the mobile device via the repeater at frequency $f_x+f_{\Delta,\,d}$ from the mobile device may cause the signal to be received by the base station at frequency $f_x+f_{\Delta,\,d}+f_{\Delta,\,u}$.

Although discussed with reference to a mobile repeater, any communication device having a relative velocity with respect to a signal source or signal destination can experience a frequency shift in signals due to the Doppler effect. Accordingly, systems and methods that can correct the frequency shift in a communications device moving relative to one or more sources or destinations are desirable.

SUMMARY

Certain aspects and embodiments of the present invention are directed to a Doppler shift correction sub-system that can be disposed in a communication device. The Doppler shift correction sub-system can include a processor and a frequency-shifting module. The processor can be configured to determine a corrective frequency shift based on a representative transmission frequency and a velocity of the mobile repeater relative to a source. The processor can provide the corrective frequency shift to a frequency-shifting module. The frequency-shifting module can be configured to shift the signal using the corrective frequency shift prior to transmitting the signal to a destination.

These illustrative aspects and embodiments are mentioned not to limit or define the invention, but to provide examples to aid understanding of the inventive concepts disclosed in this application. Other aspects, advantages, and features of the present invention will become apparent after review of the entire document.

DETAILED DESCRIPTION

Figure 1:
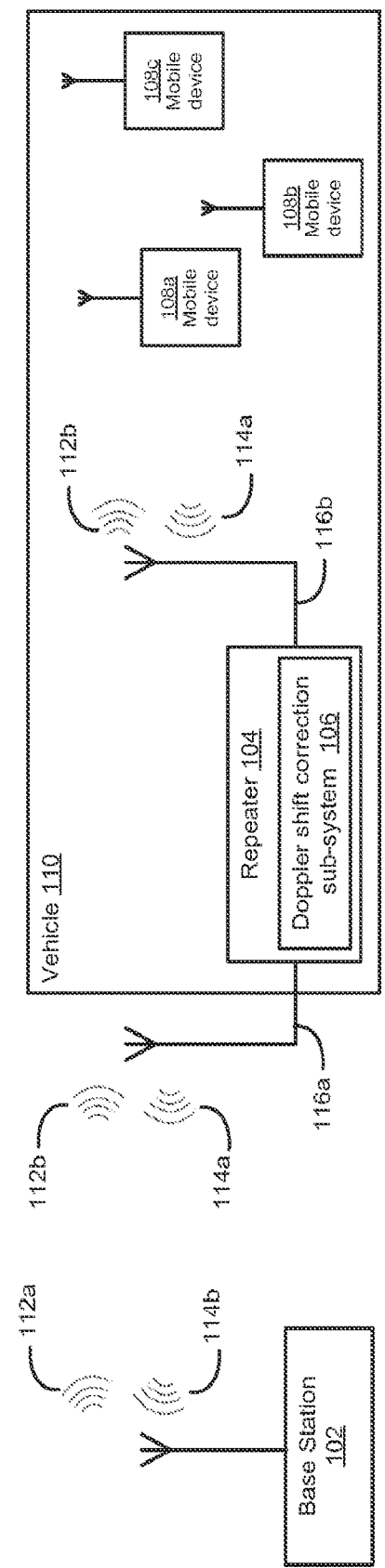
FIG. 1 depicts a block diagram of a base station in communication with a mobile repeater having a Doppler shift correction sub-system according to one embodiment.

Certain aspects and embodiments are directed to a Doppler shift correction sub-system that can be disposed in a communication device. A Doppler shift can be a change in the frequency of a signal from a transmitter to a receiver caused by the movement of the transmitter and the receiver relative to one another. The communication device can communicate signals with one or more base stations or other transceivers.

A Doppler shift correction sub-system can be disposed in any embodiment of a communication device. In some embodiments, the communication device can be a mobile repeater. In other embodiments, the communication device can be a mobile phone. In other embodiments, the communication device can be a computing device such as (but not limited to) a laptop or a tablet.

The Doppler shift correction sub-system can determine a Doppler shift caused by the movement of the communication device relative to either a base station transmitting a signal received by the communication device or a base station receiving a signal transmitted by the communication device. The Doppler shift correction sub-system disposed in the communication device can determine the Doppler shift using a representative transmission frequency. The representative transmission frequency can be a known frequency, a frequency determined from known system parameters of the transmitter used to transmit the signal, or a frequency estimated based on system parameters of the transmitter. Examples of a representative frequency can include (but are not limited to) a frequency associated with the transmission frequency channel, a mean frequency of a transmission frequency band, etc. The Doppler shift correction sub-system can correct the Doppler shift by applying an equal to and opposite frequency shift to a signal transmitted by the repeater. The Doppler shift correction sub-system can thus reduce processing resources required to correct a Doppler shift by using a known or representative transmission frequency and known geographic information about the transmitters and receivers in the system (e.g. geographic location, speed, and direction of travel) rather than measuring the frequency shift of the signal.

In one embodiment, a communication device having a Doppler shift correction sub-system, such as a repeater or a mobile phone, can receive a signal from a source, such as a base station. The signal can have a Doppler shift caused by the velocity of the mobile repeater relative to the base station. The Doppler shift correction sub-system can determine a corrective frequency shift based on a representative transmission frequency and a velocity of the repeater relative to the transmitter.

In some embodiments, a known frequency can be a frequency associated with a transmission frequency channel used by the base station. For example, a Personal Communications Service ("PCS") band may be 1930-1990 MHz with a channel raster or frequency step of 50 kHz. For a vehicle moving at 200 km/h, the Doppler shift at 1930 MHz may be approximately 357 Hz and the Doppler shift at 1990 MHz may be approximately 369 Hz, both of which are less than the channel raster. The Doppler shift correction sub-system can demodulate the signal received from the base station, determine which channel is being received, and identify the frequency associated with that channel.

In other embodiments, a representative transmission frequency can be the mean or center frequency of a transmission frequency band used by a base station to transmit the signal. For example, in a PCS band of 1930-1990 MHz, the Doppler shift correction sub-system can determine a mean frequency of 1960 MHz. For a vehicle moving at 200 km/h, determining the Doppler shift using a mean frequency of 1960 MHz may result in a maximum error of +/−6 Hz. An error of +/−6 Hz may not be sufficient to degrade the ability of a receiver to demodulate or decode the signal.

The Doppler shift correction sub-system can apply the corrective frequency shift to the signal. For example, a corrective frequency shift equal to and opposite the Doppler shift can be applied to both the uplink signals and downlink signals processed by the communication device. Applying corrective frequency shift can cause the net frequency shift of signals communicated between a base station and a mobile device via the communication device to be approximately zero.

For example, a downlink signal received from a base station can be filtered, amplified, and down-converted to a frequency suitable for an analog-to-digital converter. The analog-to-digital converter can convert the downlink signal to a digital downlink signal. The digital downlink signal can be provided to a processor to determine the corrective frequency shift. The processor can configure a signal generator, such as a numerically controlled oscillator ("NCO"), to generate a corrective signal, such as a complex sinusoidal signal, having a corrective frequency that is the additive inverse of the Doppler shift. The corrective signal can be applied to the digital downlink signal using a mixing module, such as a quadrature mixer. The digital output signal of the quadrature mixer can have a frequency shifted down by the corrective frequency shift. The mixer digital output signal can be converted back to analog with a digital-to-analog converter, up-converted, filtered, amplified, and transmitted to a mobile device.

The mobile repeater can transmit a downlink signal corrected using the corrective frequency shift to one or more mobile devices in communication with the mobile repeater. The mobile device can receive the signal at a frequency approximating the transmission frequency. In some embodiments, the mobile devices can be located in or associated with the same vehicle as the repeater (e.g., within the carriages of the same train), and therefore any Doppler shift to due to changes in the distance between the repeater and mobile stations is sufficiently small to avoid causing signal degradation.

In additional or alternative embodiments, the Doppler shift correction sub-system can determine the velocity using the geographic location of the mobile repeater and the geographic location of the base station or other transmitter.

The Doppler shift correction sub-system can determine the geographic location of the repeater using any suitable system or method. For example, the Doppler shift correction sub-system can determine the geographic location of the repeater using a global positioning system ("GPS") receiver included in, or in communication with, the mobile repeater. In some embodiments, the GPS receiver can be integrated into the repeater. In other embodiments, the repeater can receive the GPS information from an external GPS system. In other embodiments, the Doppler shift correction sub-system can access a map stored in a memory device accessible to the Doppler shift correction sub-system, such a computer readable medium. The Doppler shift correction sub-system can use the location of the vehicle on the map to determine the geographic location of the repeater. For example, the locations corresponding to a train network can be stored in a database and the geographic location of the repeater can be determined from the location of the train on the track network.

The Doppler shift correction sub-system can determine the geographic location of the base station or other transmitter using any suitable system or method. In some embodiments, a memory included in, or in communication with, the Doppler shift correction sub-system can include a data file having identifiers associated with geographic locations of base stations or other transmitters. The Doppler shift correction sub-system can receive an identifier identifying a transmitter with the signal. The Doppler shift correction sub-system can decode the identifier and use the identifier to retrieve the geographic location of the transmitter. In other embodiments, the Doppler shift correction sub-system can determine the location of the base station by accessing a data file to identify base stations within a given radius of the location of the repeater and determine the assigned frequencies of base stations within the radius. The Doppler shift correction sub-system can compare the received frequencies of the received signals with the assigned frequencies of the base stations within the radius to determine the base station from which the signals are being received and the corresponding location of the base station.

In additional or alternative embodiments, the Doppler shift correction sub-system can modify a frequency of a signal to be transmitted from the mobile repeater to a receiver to correct for a Doppler shift caused by the velocity of the mobile transmitter relative to the receiver. The Doppler shift correction sub-system can identify a receiver to which the signal is to be transmitted. The receiver can be, for example, a base station in communication with a mobile device in a coverage area serviced by the mobile repeater. The Doppler shift correction sub-system can determine a second corrective frequency based on a representative transmission frequency at which the signal will be transmitted to the base station and a velocity of the repeater relative to the receiver. The Doppler shift correction sub-system can apply the second corrective frequency shift to the signal. The mobile repeater can transmit the signal as corrected using the second corrective frequency shift to the receiver.

Detailed descriptions of certain embodiments are discussed below. These illustrative examples are given to introduce the reader to the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present invention.

FIG. 1 depicts a block diagram of telecommunications system including a base station 102 in communication with a mobile repeater 104 according to one embodiment. The mobile repeater 104 can include a Doppler shift correction sub-system 106 and antennas 116a, 116b.

The mobile repeater 104 can communicate signals with the base station 102 and the mobile devices 108a-c via antennas 116a, 116b, respectively. Although FIG. 1 depicts the mobile repeater 104 as having two antennas, the mobile repeater 104 can include any number of antennas or other suitable devices, such as radiating cables, for communicating signals with a base station 102 and mobile devices 108a-c.

The mobile repeater 104 and mobile devices 108a-c can be located in or associated with a vehicle 110 or other moving structure. Examples of a vehicle 110 can include (but are not limited to) planes, trains, automobiles, ferries, etc. The movement of vehicle 110 is depicted by the rightward arrow in FIG. 1. Any direction of movement, however, can be used.

The mobile repeater 104 can communicate signals with the base station 102 via a wireless communication medium. The mobile repeater 104 can also communicate with one or more mobile devices 108a-c in a coverage area serviced by the mobile repeater 104. The mobile repeater 104 can radiate signals from the base station to one or more physical areas within the vehicle 110.

The base station 102 can transmit a downlink signal 112a at a frequency $f_d$ to a one or more of the mobile devices 108a-c via the mobile repeater 104. The Doppler effect resulting from the movement of the mobile repeater 104 in vehicle 110 relative to the base station 102 can cause a frequency shift $f_{\Delta, d}$ in the downlink signal 112a such that the mobile repeater receives a Doppler-shifted signal 112b having a frequency $(f_d + f_{\Delta, d})$. The frequency shift $f_{\Delta, d}$ can be calculated as $f_{\Delta, d} = -(v_{s, r}) \times f_d/c$, where $v_{s, r}$ is the velocity of the mobile repeater 104 relative to the base station 102 and c is speed of signal propagation between the mobile repeater 104 and the base station 102. In the absence of any correction for a frequency shift caused by the Doppler effect, the Doppler-shifted signal 112b, rather than the downlink signal 112a, can be transmitted to the mobile devices 108a-c.

The mobile repeater 104 can transmit an uplink signal 114a to the base station 102. The uplink signal 114a transmitted by the mobile repeater 104 can have a frequency $f_u$. The Doppler effect resulting from the movement of the mobile repeater 104 relative to the base station 102 can cause a frequency shift $f_{\Delta, u}$ in the uplink signal 114a. In the absence of any correction for the frequency shift caused by the Doppler effect, the base station can receive a Doppler-shifted signal 114b having a frequency $(f_u + f_{\Delta, u})$, where the frequency shift $f_{\Delta, u}$ can be calculated as $f_{\Delta, u} = -(v_{s, r}) \times f_u/c$, rather than the signal the uplink signal 114a.

In the absence of any correction for a frequency shift caused by the Doppler effect, a frequency shift error can be compounded when mobile devices 108a-c use the frequency of a signal received from the base station 102 as a reference frequency. For example, a mobile repeater 104 can provide an erroneous signal 112b to mobile devices 108a-c. The mobile devices 108a-c can use the erroneous signal 112b as an erroneous reference for selecting a frequency with which to transmit signals to the base station 102.

The Doppler shift correction sub-system 106 can correct errors in the signals communicated between the base station 102 and the mobile repeater 104. The Doppler shift correction sub-system 106 can determine the frequency shift $f_\Delta$ caused by the Doppler effect. The Doppler shift correction sub-system 106 can apply an equal and opposite frequency shift to a signal received by the mobile repeater 104 from the base station 102 and transmitted to the mobile devices 108a-c. The Doppler shift correction sub-system 106 can apply an equal and opposite frequency shift to a signal received by the mobile repeater 104 from the mobile devices 108a-c and transmitted to the base station 102.

Figure 2:
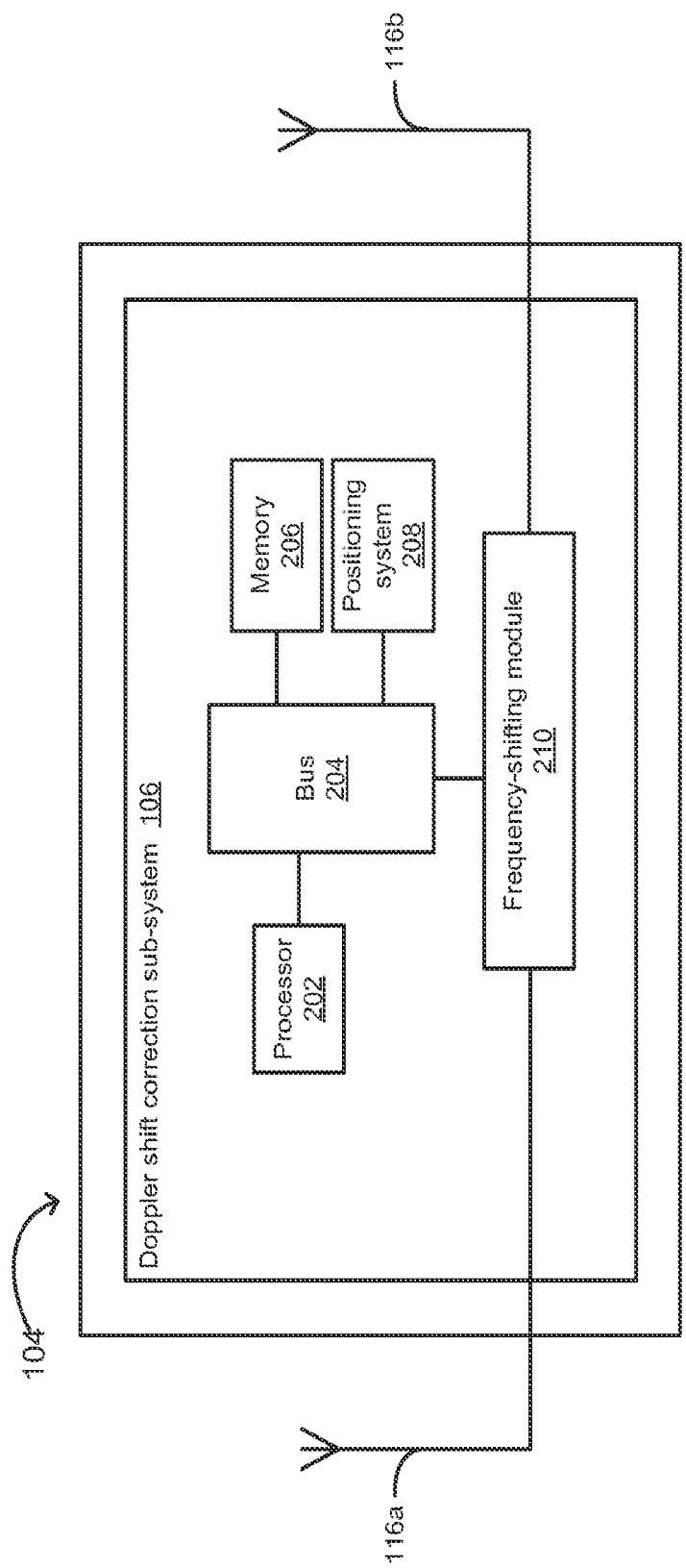
FIG. 2 is a block diagram of a mobile repeater having a Doppler shift correction sub-system according to one embodiment.

FIG. 2 is a block diagram of an exemplary mobile repeater 104 having a Doppler shift correction sub-system 106. The Doppler shift correction sub-system 106 can include a processor 202, a bus 204, a memory 206, a positioning system 208, and frequency-shifting module 210.

The processor 202 can execute code stored on a computer-readable medium, such as a memory 206, to cause the Doppler shift correction sub-system 106 of the mobile repeater 104 to generate corrective frequency shifts compensating for frequency shifts caused by the Doppler effect. Examples of a processor 202 can include (but are not limited to) a microprocessor, an application-specific integrated circuit ("ASIC"), a field-programmable Gate Array ("FPGA"), a Peripheral Interface Controller ("PIC"), or other suitable processor. The processor 202 may include one processor or any number of processors.

The processor 202 can access code stored in the memory 206 via the bus 204. The memory 206 may be any non-transitory computer-readable medium capable of tangibly embodying code. The memory 206 can include electronic, magnetic, or optical devices. Examples of a memory 206 can include (but are not limited to) random access memory (RAM), read-only memory (ROM), magnetic disk, an ASIC, a configured processor, or other storage device. The bus 204 may be any device capable of transferring data between components of the mobile repeater 104. The bus 204 can include one device or multiple devices.

Instructions can be stored in memory 206 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The memory 206 can also include information about base stations serviced by the mobile repeater 104. For example, the memory 206 can include a data file having, for each base station serviced by the mobile repeater, a base station identifier, a geographic location of the base station, and one or more frequencies used by the base station to communicate signals. In other embodiments, the processor 202 can access a data file stored in a remotely accessible database.

The positioning system 208 can be any system configured to determine a geographic location for the mobile repeater 104. An example of a positioning system 208 is a global positioning system including a space-based satellite navigation system. The positioning system 208 can include one device or multiple devices. The positioning system 208 can communicate with the processor 202 via the bus 204.

Although FIG. 2 depicts the positioning system 208 as integrated with the Doppler shift correction sub-system 106, other embodiments are possible. For example, the processor 202 of the Doppler shift correction sub-system 106 can receive information from an external GPS or other positioning system in communication with the mobile repeater 104.

The frequency-shifting module 210 can modify the frequency of signals communicated with the base station 102 and/or the mobile devices 108a-c via the antennas 116a, 116b. The frequency-shifting module 210 can be communicatively coupled to the antennas 116a, 116b via any suitable means. The frequency-shifting module 210 can receive control signals from the processor 202 via the bus 204. The control signals from the processor 202 can configure the frequency-shifting module 210 to modify the frequency of the signals communicated with the base station 102 and/or the mobile devices 108a-c via the antennas 116a, 116b.

Although FIGS. 1 and 2 depict an example embodiment of a Doppler shift correction sub-system 106 disposed in a mobile repeater 104, other configurations are possible. The Doppler shift correction sub-system 106 can be disposed in any suitable communication device configured to receive and transmit signals with other communication devices. In some embodiments, a communication device having a Doppler shift correction sub-system can be a mobile phone, such as a smart phone. In other embodiments, a communication device having a Doppler shift correction sub-system can be a computing device, such as a laptop computer or a tablet computer.

Figure 3:
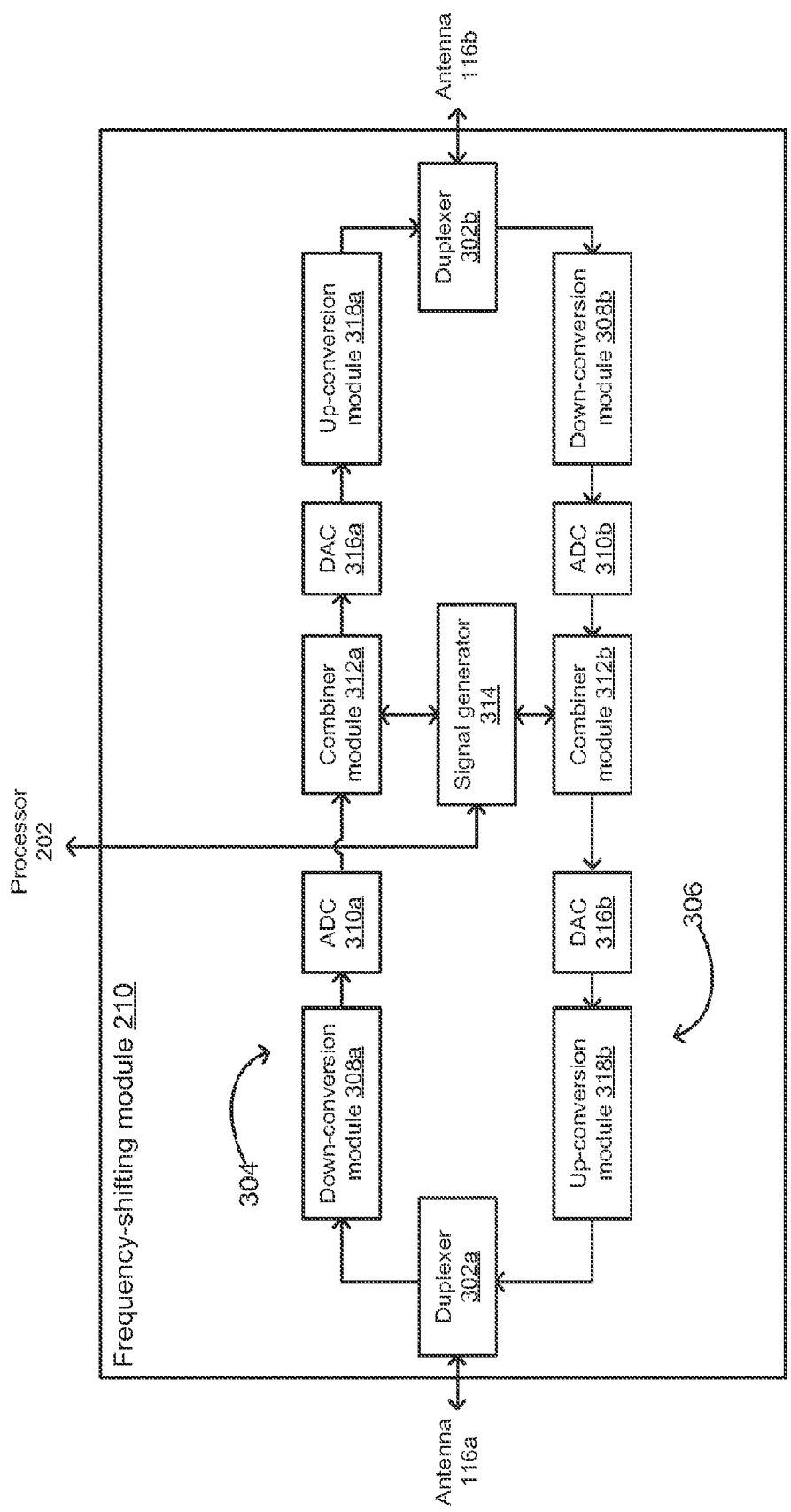
FIG. 3 is a block diagram of a frequency-shifting module of a Doppler shift correction sub-system according to one embodiment.

FIG. 3 is a block diagram depicting an embodiment of a frequency-shifting module 210 of a Doppler shift correction sub-system 106. The frequency-shifting module 210 can include duplexers 302a, 302b, a downlink path 304, and an uplink path 306. The duplexers 302a, 302b can isolate the downlink path 304 from the uplink path 306.

Downlink signals received by the mobile repeater 104 from the base station 102 via the antenna 116a can traverse the downlink path 304 from the duplexer 302a through the duplexer 302b to the mobile devices 108a-c via the antenna 116b. The downlink path 304 can include a down-conversion module 308a, an analog-to-digital converter 310a, a mixing module 312a communicatively coupled to a signal generator 314, a digital-to-analog converter 316a, and an up-conversion module 318a.

The down-conversion module 308a can down-covert the frequency of a downlink signal for processing by the frequency-shifting module 210. The down-conversion module 308a can include, for example, a mixer in communication with a local oscillator and one or more amplifiers. The analog-to-digital converter 310a can convert the down-converted downlink signal to a digital signal.

The mixing module 312a can combine the digital downlink signal with a corrective signal provided by the signal generator 314. The mixing module 312a can include, for example, a quadrature mixer. The signal generator 314 can be, for example, a numerically controlled oscillator. The signal generator 314 can be communicatively coupled to and receive control signals from the processor 202. The signal generator 314 can generate a corrective signal having a corrective frequency specified by a control signal from the processor 202. The corrective frequency can be determined such that combining the downlink signal with the corrective signal can eliminate or mitigate a frequency shift in the downlink signal caused by the Doppler effect. For example, the corrective signal can have a correction frequency that is the additive inverse of the frequency shift resulting from the Doppler effect.

The digital-to-analog converter 316a can convert the modified downlink signal outputted from the mixing module 312a from a digital signal to an analog signal. The up-conversion module 318a can up-convert the modified downlink signal to a frequency for transmission to the mobile devices 108a-c using the antenna 116b.

Uplink signals received by the mobile repeater 104 from the mobile devices 108a-c via the antenna 116b can traverse the uplink path 306 from the duplexer 302b through the duplexer 302a to the base station 102 via the antenna 116a. The uplink path 306 can include a down-conversion module 308b, an analog-to-digital converter 310b, a mixing module 312b communicatively coupled to the signal generator 314, a digital-to-analog converter 316b, and an up-conversion module 318b. The down-conversion module 308b, the analog-to-digital converter 310b, the digital-to-analog converter 316b, and the up-conversion module 318b perform similar functions as the corresponding functional blocks of the downlink path as described above.

The mixing module 312b can combine the digital uplink signal with a corrective signal provided by the signal generator 314. The mixing module 312b can include, for example, a quadrature mixer. The signal generator 314 can generate a corrective signal having a corrective frequency specified by a control signal from the processor 202. The corrective frequency can be determined such that combining the uplink signal with the corrective signal can eliminate or mitigate a frequency shift in the uplink signal caused by the Doppler effect.

For example, a Doppler shift can cause an uplink signal having a frequency of $f_u$ to be frequency shifted by the frequency $(-f_{\Delta, u})$. A corrective frequency can be determined such that combining the uplink signal at frequency $f_u$ with the corrective signal can generate a modified uplink signal at frequency $f_u + f_{\Delta, u}$. The mobile repeater 104 can transmit the modified uplink signal at frequency $f_u + f_{\Delta, u}$. A Doppler shift can cause the modified uplink signal to have a frequency $f_u + f_{\Delta, u} + (-f_{\Delta, u}) = f_u$.

Figure 4:
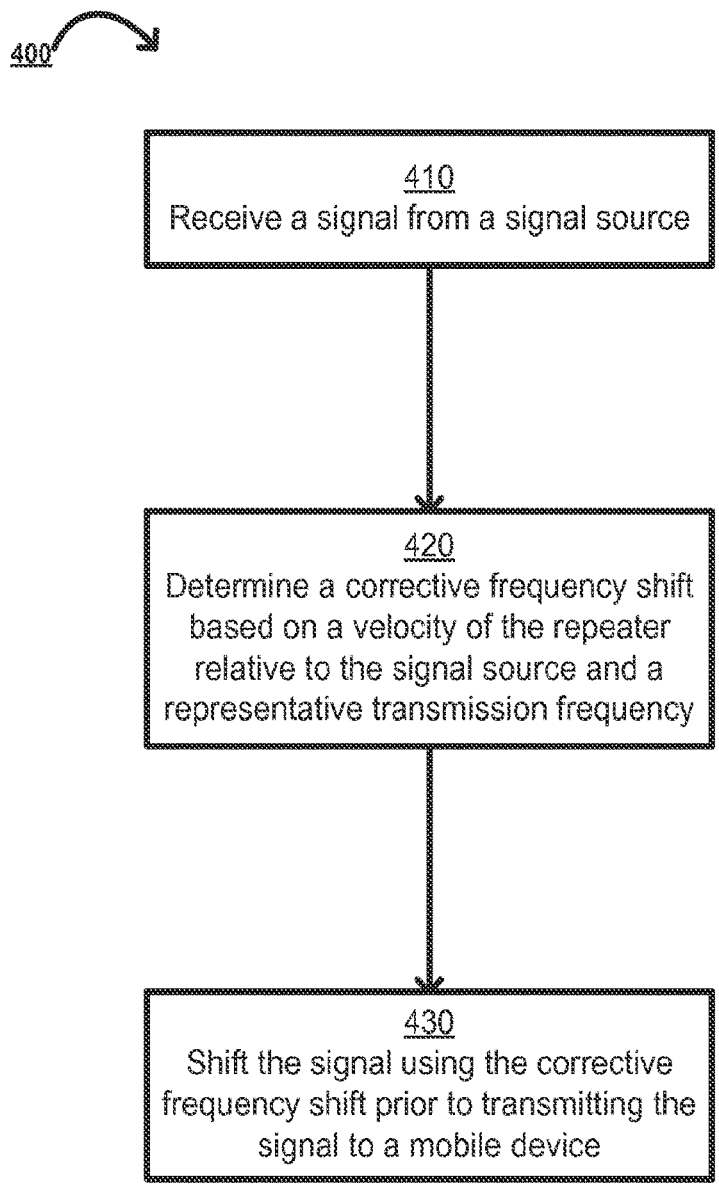
FIG. 4 is a flow chart illustrating a process for correcting a Doppler shift of a signal according to one embodiment.

FIG. 4 depicts a flow chart illustrating a process 400 for correcting a Doppler shift of a signal. The process 400 is described with reference to the communication system depicted in FIG. 1 and the system implementation of the mobile repeater 104 and Doppler shift correction sub-system 106 depicted in FIGS. 2 and 3. Other implementations and processes, however, are possible. In some embodiments, a mobile phone having a Doppler shift correction sub-system 106 can execute the process 400. In other embodiments, a computing device, such as a laptop computer or a tablet computer, having a Doppler shift correction sub-system 106 can execute the process 400.

In block 410, the Doppler shift correction sub-system 106 receives a signal from a source. The source can be, for example, the base station 102 or another transceiver in communication with the mobile repeater 104. The Doppler shift correction sub-system 106 can receive downlink signals via the antenna 116a and can receive uplink signals via the antenna 116b.

In block 420, the Doppler shift correction sub-system 106 determines a corrective frequency shift based on a representative transmission frequency and a velocity of the repeater relative to the source. The processor 202 can be configured to execute instructions stored at memory 206 to determine the corrective frequency shift.

The processor 202 can determine the corrective frequency shift based on a geographic location of the base station 102, the velocity of the mobile repeater 104 relative to the base station 102, and a mean frequency of a frequency band or frequency channel used by the base station 102 to transmit or receive a signal. In some embodiments, the geographic location of the base station 102 can be transmitted by the base station 102 to the mobile repeater 104. For example, the geographic location of the base station 102 can be included as a system information message communicated between the base station 102 and the mobile repeater 104.

In additional or alternative embodiments, geographic locations of one or more base stations can be stored in a data file in the memory 206 or a remote database that can be accessed by processor 202. The data file can be updated regularly with the geographic location of base stations or other fixed transceivers serviced by the mobile repeater 104. Signals from the base station 102 can include information, such as an identifier of the base station or a cell serviced by the base station, that uniquely identifies the base station that is the source of the signal. The processor 202 can retrieve the geographic location of the base station 102 from the data file using the identifier.

In additional or alternative embodiments, the processor 202 can access a data file stored in the memory 206 or a remote database. The data file can include the geographic locations of one or more base stations and the assigned frequencies of the base stations within a given radius of the geographic location of the mobile repeater 104. The processor 202 can compare the measured frequencies of the signals received from the base station 102 with the assigned frequencies of base stations in the data file to determine the geographic location associated with a base station using those frequencies.

In some embodiments, the geographic location, speed, and direction of travel of the mobile repeater 104 can be determined by the positioning system 208. In other embodiments, the geographic location can be determined from a digitized map stored in memory 206. The geographic location of the vehicle 110 on the map can be used to determine the geographic location of the mobile repeater 104. For example, the geographic locations corresponding to a train track network can be stored in a data file and the geographic location of the train on the track can be used to determine the corresponding geographic location of the mobile repeater.

The processor 202 can use the geographic location, speed, and direction of the mobile repeater 104 and the geographic location of the base station to determine the relative velocity between the repeater and the transmitter of base station. The relative velocity between the repeater and the transmitter can be used to determine the frequency shift caused by the Doppler effect.

The processor 202 can use a representative transmission frequency of downlink signals transmitted by the base station 102 to determine the frequency shift in a downlink signal from the base station 102 to the mobile repeater 104 caused by the Doppler effect. The representative transmission frequency $f_r$ can be used to calculate a corrective shift $f_c = -(v_{s,r}) \times f_r / c$.

In some embodiments, the representative transmission frequency $f_r$ used by the processor 202 can be the mean frequency of the frequency band used by the base station 102. The error in the corrective frequency shift, which can be the difference between the actual Doppler shift and the estimated Doppler shift, can be sufficiently small that the ability of a receiver to demodulate, decode, or otherwise process the signal is not degraded. For example, a mean frequency of 1960 MHz can be used for a PCS signal having a frequency within the within a frequency band of 1930 MHz–1990 MHz. Using a mean frequency of 1960 MHz for a vehicle 110 moving at 200 km/h can provide a corrective frequency shift with an error of +/−6 Hz.

In additional or alternative embodiments, the processor 202 can determine a representative transmission frequency from the frequency band used by the base station 102 and the channel sets repeated within the frequency band. For example, a PCS frequency band can be 1930-1990 MHz with a channel raster of 50 kHz. For a vehicle 110 moving at 200 km/h, the Doppler shift at 1930 MHz may be approximately 357 Hz and the Doppler shift at 1990 MHz may be approximately 369 Hz, both of which are less than the channel raster. By demodulating the receive signal, the processor 202 can determine which channel is being received. The processor 202 can use the frequency associated with the determined channel as a representative frequency for calculating the corrective frequency shift.

In block 430, the Doppler shift correction sub-system 106 shifts the signal using the corrective frequency shift prior to transmitting the signal to one or more of the mobile devices 108a-c. The processor 202 of the Doppler shift correction sub-system 106 can generate a control signal specifying a corrective frequency. The corrective frequency can be sufficient to cause a corrective frequency shift in an uplink signal or downlink signal that is equal and opposite to a frequency shift caused by the Doppler effect. The processor 202 can communicate the control signal to the signal generator 314 via the bus 204.

To correct a frequency shift in a downlink signal caused by the Doppler effect, the signal generator can provide a corrective signal with the corrective frequency to the mixing module 312a. To correct a frequency shift in an uplink signal caused by the Doppler effect, the signal generator can provide a corrective signal with the corrective frequency to the mixing module 312b. The combiners 312a, 312b can combine the corrective signal with the respective downlink and uplink signals. The resulting net frequency shift between the base station 102 and the mobile devices 108a-c can be approximately zero.

Although systems and methods for correcting a Doppler shift have been discussed with respect to a base station transmitting at a single frequency, a base station can transmit multiple channels on multiple transmission frequencies. A Doppler shift correction sub-system 106 can calculate a frequency shift for each channel and apply a corrective frequency shift to each channel separately. The Doppler shift correction sub-system 106 can do so by filtering each channel to isolate the channel from the other received channels, applying a corrective frequency shift specific to that channel, and combining all the channels after applying one or more corrective frequency shifts to one or more respective channels. In additional or alternative embodiments, an average corrective frequency shift of all the channels can be applied to all channels.

Although systems and methods for correcting a Doppler shift have been discussed with respect to a single base station, a mobile repeater 104 having a Doppler shift correction sub-system 106 can be used to repeat signals from several base stations at different geographic locations, resulting in different Doppler shifts for signals communicated with each base station. The Doppler shift correction sub-system 106 can independently correct Doppler shifts in signals communicated between each base station and the repeater. The Doppler shift correction sub-system 106 can determine a relative velocity for each base station. The Doppler shift correction sub-system 106 can separate signals from base stations operating on different frequencies by frequency filtering, separately apply a respective corrective frequency shift to signals from each base station, and recombine signals before retransmitting the signals to the mobile devices 108a-c. The Doppler shift correction sub-system 106 can separate signals from base stations operating on the same frequency by beam-forming or other signal processing methods and apply the corrective frequency shift to each signal set separately.

In additional or alternative embodiments, for signals that cannot be separated, the Doppler shift correction sub-system 106 can apply a corrective frequency shift calculated using a representative frequency associated with the base station transmitting a downlink signal with the greatest power. In additional or alternative embodiments, for signals that cannot be separated, the Doppler shift correction sub-system 106 can apply a corrective frequency shift calculated using a representative frequency associated with to the closest base station.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each embodiment disclosed can be combined with any other embodiment.

The invention claimed is:

1. A repeater comprising:
   a processor configured to determine a corrective frequency shift for a signal received from a source device by:
   determining a representative transmission frequency by determining a channel associated with the signal and identifying the representative transmission frequency associated with the channel;
   determining a relative velocity of the repeater to the source device by:
   determining an identifier, identifying the source device, in the signal;
   retrieving a geographic location of the source device from a computer readable medium based on the identifier; and
   determining the relative velocity based on the geographic location of the source device and a geographic location of the repeater; and
   determining the corrective frequency shift for the signal, without measuring a frequency shift of the signal, by multiplying the relative velocity by the representative transmission frequency and dividing the product by a propagation speed of the signal;
   a frequency-shifting module in communication with the processor, the frequency-shifting module being configured to shift the signal using the corrective frequency shift prior to wirelessly transmitting the shifted signal to a destination device, wherein the destination device is different from the source device;
   wherein the processor is further configured to:
   identify a destination, amongst a plurality of source devices, to which an uplink signal is to be transmitted; and
   determine a compensating frequency shift for the uplink signal based on an uplink transmission frequency and a velocity of the repeater relative to a geographic location of the destination;
   wherein the frequency-shifting module is further configured to shift the uplink signal using the compensating frequency shift prior to transmitting the uplink signal to the destination.

2. The repeater of claim 1, wherein the representative transmission frequency comprises a mean frequency of a transmission frequency band used by the source device.

3. The repeater of claim 1, wherein the processor is further configured to determine a transmission frequency channel for a measured frequency of the signal, wherein the representative transmission frequency comprises a frequency associated with the transmission frequency channel.

4. The repeater of claim 1, wherein the repeater further comprises a global positioning system, wherein the processor is further configured to determine the geographic location of the repeater using the global positioning system.

5. The repeater of claim 1, wherein the processor is further configured to determine the geographic location of the source device by:
   determining the geographic location of the repeater;
   retrieving one or more base stations within a radius of the geographic location of the repeater from a data file stored in a computer readable medium, each base station having stored in the computer readable medium a respective location and a respective associated frequency;
   determining that a measured frequency of the signal matches an associated frequency of one of the one or more base stations; and
   determining a geographic location of the one of the one or more base stations based on the associated frequency.

6. The repeater of claim 1, further comprising an antenna configured to transmit the signal corrected using the corrective frequency shift to the destination device.

7. A method comprising:
   receiving a signal at a communication device from a source device;
   determining a representative transmission frequency by determining a channel associated with the signal and identifying the representative transmission frequency associated with the channel;
   determining a relative velocity of the communication device to the source device by:
   determining an identifier, identifying the source device, in the signal;
   retrieving a geographic location of the source device from a computer readable medium based on the identifier;
   determining the relative velocity based on the geographic location of the source device and a geographic location of the communication device;
   determining a corrective frequency shift for the signal, without measuring a frequency shift of the signal, by multiplying the relative velocity by the representative transmission frequency and dividing the product by a propagation speed of the signal;

shifting the signal using the corrective frequency shift prior to wirelessly transmitting the shifted signal to a destination device, wherein the destination device is different from the source device;

identifying a destination, amongst a plurality of source devices, to which an uplink signal is to be transmitted;

determining a compensating frequency shift for the uplink signal based on an uplink transmission frequency and a velocity of the communication device relative to a geographic location of the destination; and shifting the uplink signal using the compensating frequency shift prior to transmitting the uplink signal to the destination.

8. The method of claim 7, wherein the representative transmission frequency comprises a mean frequency of a transmission frequency band used by the source device.

9. The method of claim 7, further comprising determining a transmission frequency channel for a measured frequency of the signal, wherein the representative transmission frequency comprises a frequency associated with the transmission frequency channel.

10. The method of claim 7, further comprising determining a geographic location of the communication device using a global positioning system.

11. The method of claim 7, further comprising determining the geographic location of the source device by:

determining the geographic location of the communication device;

retrieving one or more base stations within a radius of the geographic location of the communication device from a data file stored in a computer readable medium, each base station having stored in the computer readable medium a respective location and a respective associated frequency;

determining that a measured frequency of the signal matches an associated frequency of one of the one or more base stations; and determining a geographic location of the one of the one or more base stations based on the associated frequency.

12. The method of claim 7, wherein the communication device comprises a repeater.

13. The method of claim 7, wherein the communication device comprises a mobile phone.

14. The method of claim 7, wherein the communication device comprises a mobile computing device.

15. The method of claim 14, wherein the mobile computing device comprises at least one of a laptop or a tablet computer.

* * * * *